United States Patent [19]

Shen

[11] Patent Number: 4,924,942

[45] Date of Patent: May 15, 1990

[54] WELL FORMING PROCESS

[75] Inventor: Jian-Chyun Shen, Irvine, Calif.

[73] Assignee: Union Oil Company of California, Brea, Calif.

[21] Appl. No.: 317,004

[22] Filed: Feb. 28, 1989

[51] Int. Cl.$^5$ .................... E21B 33/138; E21B 33/14; E21B 33/16

[52] U.S. Cl. .................... 166/291; 166/292; 175/72; 106/89; 106/98

[58] Field of Search .................... 166/291, 293; 175/72; 106/89, 98; 252/8.551

[56] References Cited

U.S. PATENT DOCUMENTS

| | | | |
|---|---|---|---|
| 2,206,389 | 7/1940 | Cannon | 166/292 |
| 2,612,954 | 10/1952 | Hamilton, Jr. | 166/291 X |
| 3,131,075 | 4/1964 | Brooks, Jr. | 166/293 X |
| 3,563,313 | 2/1971 | Spangle | 166/292 |
| 3,582,376 | 6/1971 | Ames | 106/89 X |
| 3,887,009 | 6/1975 | Miller et al. | 166/292 |
| 4,082,561 | 4/1978 | Nakagawa et al. | 106/89 |
| 4,190,454 | 2/1980 | Yamagisi et al. | 106/90 |
| 4,204,875 | 5/1980 | Szalavitz | 106/87 |
| 4,221,598 | 9/1980 | Doblinger | 106/87 |
| 4,256,500 | 3/1981 | Turpin, Jr. | 106/88 |
| 4,304,298 | 12/1981 | Sutton | 166/292 |
| 4,524,828 | 6/1985 | Sabins et al. | 166/293 |
| 4,642,137 | 2/1987 | Heitzmann et al. | 106/89 X |
| 4,762,563 | 8/1988 | Colin | 106/98 X |

OTHER PUBLICATIONS

Hajjouji et al., *Cement and Concrete Research*, 17:814–822 (1987).
Smith, *Cementing*, Society of Petroleum Engineers, pp. 7–41 (1987).
Smith, Cementing, Society of Petroleum Engineers, New York, New York (1987), p. 65.
Aguilera, *Naturally Fractured Reservoirs*, Petroleum Publishing Company, Tulsa Oklahoma (1980), pp. 51–52.
Turki et al., SPE 11490 (1983).
Canson, SPE/IADC 13440 (1985).
George et al., *Well Servicing*, (May–Jun. 1988), pp. 20–22.

Primary Examiner—George A. Suchfield
Attorney, Agent, or Firm—Gregory F. Wirzbicki; Shlomo R. Frieman

[57] ABSTRACT

A thixotropic preflush fluid is employed in a well drilling operation to prevent loss of cement slurry to an air zone penetrated during the drilling operation. The preflush fluid comprises water, a cement, calcium sulfate, and a quick-hardening accelerator. Optionally, the preflush fluid also comprises a thickening agent.

43 Claims, 1 Drawing Sheet

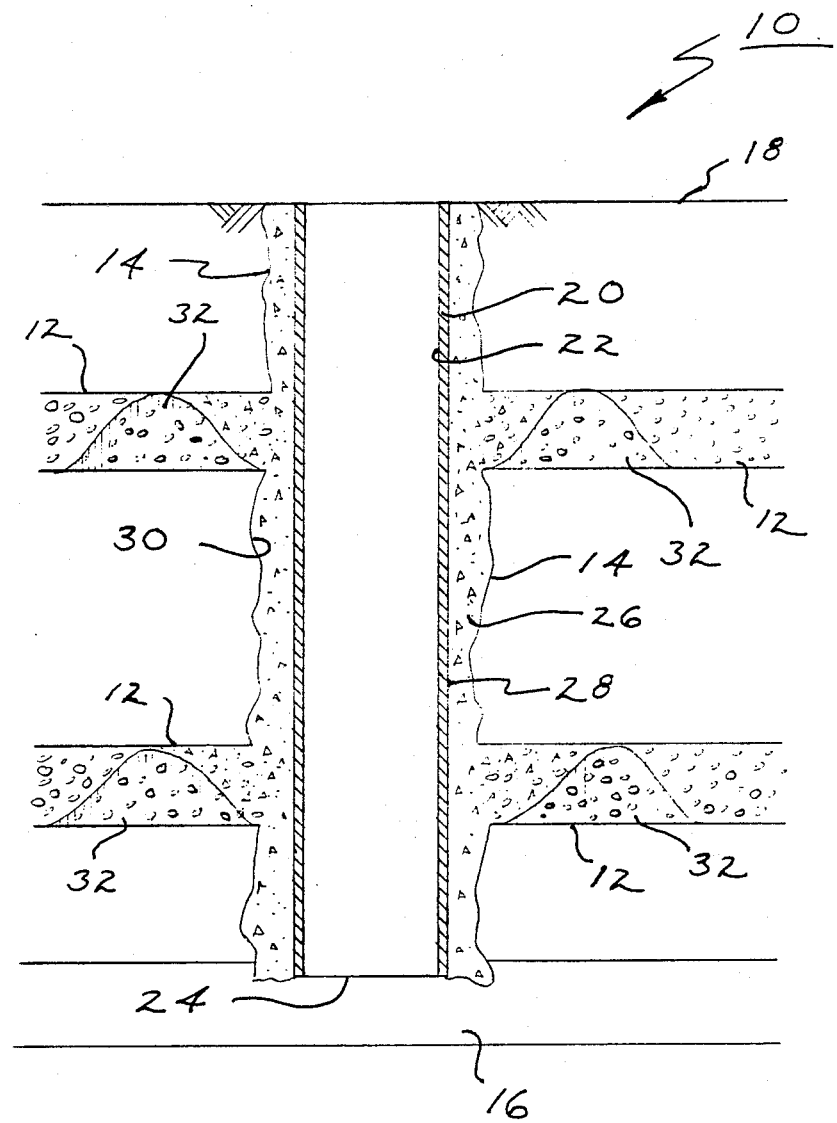

WELL FORMING PROCESS

BACKGROUND

The present invention relates to a process for forming a well, a preflush composition for use in the well forming process, and a well configuration.

One or more lost circulation zones can be penetrated during a well drilling operation. Lost circulation zones are highly permeable formations. An exemplary lost circulation zone consists mostly of unconsolidated pebbles without any substantial clay sedimentation. When a casing is set in a borehole that penetrates an lost circulation zone, a substantial amount of cement slurry used to set the casing in the borehole is generally lost to the lost circulation zone. In some instances involving lost circulation zone, no matter how much cement is poured into the borehole through the casing, the cement fails to reach the surface of the borehole on the annulus side of the casing. In other instances, although the cement slurry initially reaches the surface of the borehole, the cement slurry excessively recedes into the borehole. In the latter situations, cement has been observed to slip over about 150 feet back into the borehole.

A remedial cementing job is usually necessary for wells constructed through these lost circulation zone. The loss of cement slurry to the lost circulation zone and the remedial cementing jobs adds to the cost of the drilling operation. Furthermore, even after the remedial cementing work has been performed, casing expansion and contraction during well operations, e.g., steam injection and shut-down, are serious problems.

Cement slurries containing various additives have been employed in an attempt to overcome the above problems. However, the use of additive-containing cement slurries has at least two disadvantages. First, additive-containing cement slurries are more expensive than the conventional cement slurries used in well drilling operations. In addition, some additives change the cement slurry's rheology characteristics and make the resulting slurry more difficult to pump. Other additives can detrimentally affect the slurry's setting rate or the compressive strength of the resulting cement.

SUMMARY

The present invention provides a process for drilling wells through one or more lost circulation zones without exhibiting any substantial loss of cement to the lost circulation zones and without detrimentally affecting any cement slurry properties. In particular, the process comprises the steps of (a) drilling a borehole in the ground, (b) suspending a casing in the borehole, (c) contacting at least a portion of the region of the borehole around the outside of the casing with a preflush fluid, and (d) injecting a cement slurry into the region of the borehole around the casing. The preflush fluid comprises water, a cement, calcium sulfate, and a quick-hardening accelerator. The preflush fluid usually weighs less than about 11 pounds per gallon, and the water, the cement, the calcium sulfate, and the quick-hardening accelerator are each present in a concentration sufficient to make the preflush fluid thixotropic. As used in the specification and claims, the term "thixotropic" means a substance that, when left static, forms a gel-like material having a static gel strength of at least about 0.005 pounds per square foot in less than about 30 minutes.

As the preflush fluid passes upwardly along the outside of the casing, a portion of the fluid enters any lost circulation zone penetrated by the casing. Because of the expanded area within the lost circulation zone, the velocity of the preflush fluid slows, the viscosity of the preflush fluid increases, and the thixotropic fluid quickly forms a gel-like material having a static gel strength sufficient to substantially block passage of the cement slurry through the lost circulation zone.

The invention also encompasses the preflush fluid as well as a well system formed by the process of the instant invention.

DRAWING

The ability of the method and preflush fluid of the instant invention to prevent cement slurry loss to an lost circulation zone during a well drilling procedure without detrimentally affecting cement slurry characteristics as well as other features, aspects, and advantages of the present invention will become better understood with to the following description, appended claims, and accompanying drawing wherein the sole figure is a schematic sectional view of a well system embodying features of the present invention.

DETAILED DESCRIPTION OF THE INVENTION

The preflush fluid employed in the well drilling process of the instant invention comprises water, a cement, calcium sulfate, and a quick-hardening accelerator. The water, the cement, the calcium sulfate, and the quick-hardening accelerator are each present in the preflush fluid in a concentration sufficient to make the preflush fluid thixotropic. Generally, the preflush fluid has a viscosity at about 600 rotations per minute (rpm) of less than about 50 centipoise (cp), usually between about 0.5 to about 50 cp, and preferably between about 1 to about 25 cp. At about 3 rpm, the viscosity of the fluid typically is greater than about 100 cp, usually between about 100 to about 1,000 cp, and preferably between about 200 to about 500 cp. In addition, the preflush fluid typically weighs less than about 11 pounds per gallon (ppg). Preferably, the preflush fluid weighs less than 10 ppg. A general weight range for the fluid is about 8.5 to about 11, and preferably about 9 to about 10, ppg.

With respect to the calcium sulfate, the calcium sulfate can be calcium sulfate anhydride, calcium sulfate hemihydrate, or calcium sulfate dihydrate. In addition, a mixture of one or more forms of calcium sulfate can be employed in the preflush fluid. Calcium sulfate hemihydrate and calcium sulfate dihydrate are commercially available. Preferably, the preflush fluid comprises about 5 to about 30 percent by weight of water (% BWOW), and more preferably about 5 to about 15% BWOW, calcium sulfate.

Exemplary cements suitable for use in the preflush fluid include portland cements, pozzolanic cements, fly ash cements, blast furnace cements, and mixtures thereof. Portland cement is a type of hydraulic cement in the form of finely divided gray powder composed of lime, alumina, silica, and iron oxide as tetracalcium aluminoferrate, tricalcium aluminate, tricalcium silicate, and dicalcium silicate. Small amounts of magnesia, sodium, potassium, and sulfur are usually present in portland cement. Preferably, the cement is a portland cement and is selected from the group consisting of American Petroleum Institute (API) class C, G, and H portland cements, and mixtures thereof. The most preferred cement is API class G portland cement. Preferably, the preflush fluid comprises about 5 to about 50, and more preferably about 10 to about 30, % BWOW cement. It is also preferred that the preflush fluid have a weight ratio of calcium sulfate to cement of about 0.5:1 to about 2:1. More preferably, the weight ratio of calcium sulfate to cement is about 0.9:1 to about 1.1:1.

Typically, the quick-hardening accelerator is an alkali metal compound. Preferably, the quick-hardening accelerator is either a potassium-containing compound, a sodium-containing compound, or a mixture of potassium- and sodium-containing compounds. Exemplary potassium- and sodium-containing quick-hardening accelerators include potassium sulfate, sodium sulfate, potassium carbonate, sodium carbonate, potassium hydroxide, sodium hydroxide, potassium nitrate, sodium nitrate, potassium halide, and sodium halide. The preflush fluid preferably comprises about 0.001 to about 20, and more preferably about 1 to about 10, % BWOW quick-hardening accelerator.

Optionally, the preflush fluid also comprises a thickening agent. Fume silica is an exemplary thickening agent. The thickening agent generally is present in the preflush fluid at a concentration of up to about 5% BWOW. Although other additives can be present in the preflush fluid, it is preferred that the preflush fluid consist essentially of water, cement, calcium sulfate, quick-hardening accelerator, and thickening agent. Furthermore, it is preferred that the preflush fluid consists essentially of the specific ingredients mentioned above. For example, it is preferred that the preflush fluid be substantially devoid of any calcium aluminate other than calcium aluminate indigenously present in one or more of the above-mentioned ingredients, e.g., portland cement.

The preflush fluid is preferably made by first thoroughly mixing all of the fluid's dry ingredients. This typically entails uniformally mixing the cement, the calcium sulfate, the quick-hardening accelerator, and the thickening agent. Water is then added, with mixing, to the resulting mixture. The preflush fluid generally has a yield point of about 0.01 to about 0.1 pounds per square foot.

With reference to the sole figure, the preflush fluid is used in the present invention's well drilling operation to form a well system 10. The process of the instant invention is particularly useful when one or more lost circulation zones 12 are traversed a borehole 14 prior to the borehole 14 reaching a natural resource formation 16, e.g., a natural gas formation, an oil formation, or a geothermal formation.

In accordance with the process of this invention, a borehole 14 is drilled in the ground 18. A casing 20 is then suspended in the borehole 14. Next, the preflush fluid is passed downwardly through the interior 22 of the casing 20 past the lower lip 24 of the casing 20 and upwardly through the annular region 26 between the annulus 28 of the casing 20 and the interior wall 30 of the borehole 14. As the preflush fluid flows upwardly through the annular region 26, at least a portion of the preflush fluid enters one or more of the lost circulation zones 12 traversed by the borehole 14. The preflush fluid's velocity in the lost circulation zone 12 slows down. As the fluid slows down, its viscosity increases, and the fluid quickly forms a gel-like material 32.

The gel-like material 32 preferably forms within about 15 minutes, and more preferably within less than about 10 minutes, after the preflush fluid losses substantially all its velocity after entering the lost circulation zone 12. The resulting material 32 exhibits a static gel strength sufficient to enable the material 32 to act as a barrier and substantially reduce the migration of the cement slurry introduced into the annular region 26 after the preflush fluid. Preferably, the material 32 has a static gel strength of at least about 0.01 pound per square foot, and more preferably at least about 1 pound per square foot. Static gel strengths of up to about 10 pounds per square foot are obtainable with the gel-like materials 32 formed from the preflush fluid of the present invention. Typically, after the gel-like material 32 is formed and substantially reaches its final gel strength, the application of pressure to the material 32 will not make the material 32 flow as a fluid.

The amount of preflush fluid required per borehole 14 varies and is dependent upon, among other things, the cross-sectional area of the lost circulation zone 12 exposed by the borehole 14. Typically, from about 1 to about 40 barrels of preflush fluid are used per treatment. Usually, the amount of preflush fluid employed ranges from about 5 to about 20 barrels per treatment. The rate at which the preflush fluid is pumped into the interior 22 of the casing 20 usually runs between 0.5 to about 5 barrels per minute.

Optionally, a first spacer can be introduced into the interior 22 of the casing 20 prior to the introduction of the preflush fluid. When a water base mud is employed in drilling the borehole 14, the first spacer is usually water. However, when the drilling mud has an oil base, the first spacer usually comprises water and a surfactant. In addition, a second spacer can optionally be introduced into the interior 22 of the casing 20 between the preflush fluid and the cement. The second spacer typically is water and is generally used when the preflush fluid and the cement are not compatible.

After the cement slurry is introduced into the interior 22 of the casing 20, it is also preferred that a displacer fluid be introduced into the interior 22 of the casing 20. Typically, the displacer fluid is water or a drilling mud. In some instances, the displacer fluid is used to displace the cement slurry from the interior 22 of the casing 20. When the displacer fluid is water, the displacer fluid is commonly employed to separate the cement slurry from any subsequent fluid, e.g., drilling mud, to be subsequently pumped into the interior 22 of the casing 20.

The maximum depth of an lost circulation zone 12 treatable by the process of the instant invention depends upon the porosity of the lost circulation zone 12 and the static gel strength of the material 32. Preferably, depth of the lost circulation zone 12 proximate the borehole 14 is less than about 1,000 feet, and more preferably less than 500 feet, below the ground surface.

The process of the instant invention is inexpensive because the materials employed in the preflush fluid are cheap and because not much preflush fluid is consumed per treatment. The process is also inexpensive because it typically keeps cement slurry slippage into the borehole 14 from ground level to less than about 30 feet or 2 percent of the borehole's depth, whichever is smaller, and therefore eliminates the need to remedially treat wells for excessive slippage problems. In addition, because the preflush fluid only forms a gel-like material, as opposed to a fully hardening cement, in the event that there is a stoppage in the treatment process, whereby the preflush fluid hardens, the gel-like material can be simply displaced from the borehole 14 by exerting a pressure on the material greater than the material's static gel strength. Alternatively, the gel-like material can be readily drilled through. Furthermore, since the process of the instant invention does not require modification of the cement slurry, the cement slurry is not detrimentally affected.

EXAMPLE 1

Well Drilling Process

A borehole was drilled with the aid of a drilling mud to a depth of about 1,700 feet. The borehole penetrated at least one lost circulation zone. A 7-inch casing was placed in the borehole. A preflush fluid was prepared by first thoroughly dry mixing API G portland cement, calcium hemihydrate, potassium sulfate, and fume silica. Water was then added to the dry mixture to yield the preflush fluid. The preflush fluid consisted of about 15% BWOW cement, about 10% BWOW calcium hemihydrate, about 5% BWOW potassium sulfate, and about 1% BWOW fume silica, and water, had a yield point of about 0.01 pounds per square foot, and a viscosity at about 600 rpm of about 8 cp and a viscosity at about 3 rpm of about 300 cp.

Next, about 10 barrels of a water spacer slug was introduced into the interior of the casing at a rate of about 5.5 barrels per minute (bpm). The preflush fluid (about 10 barrels) was then pumped at a rate of about 2 to about 3 bpm into the interior of the casing immediately following the water slug. Immediately after the preflush fluid, about 100 barrels of a cement slurry was pumped into the borehole at a rate of about 5 bpm. The cement slurry comprised water and API G portland cement. A second water spacer and a bottom plug were then introduced into the interior of the casing to push the cement slurry out of the the casing and to prevent the cement slurry from reentering the casing. The cement slurry, after initially reaching the ground surface receded into the borehole.

To determine the extent of cement slurry recession and to thereby evaluate the effectiveness of the preflush treatment, after the cement slurry had set into a hardened cement a weight attached to a string was dropped into the annular region between the interior wall of the borehole and the exterior surface of the casing. The weight encountered a blockage at about 25 feet from the ground surface. This is believed to be the cement's upper surface and is less that about 1.5 percent of the borehole's depth (about 1,700 feet). Since the preflush fluid cost about $633 and since a conventional cement slurry was used in the process, this example demonstrates that the process of the instant invention can be employed to inexpensively establish well systems in lost circulation zone containing formations without substantial loss of or detrimentally affecting the cement slurry.

Although the present invention has been described in considerable detail with reference to certain preferred versions thereof, other versions are possible. For example, although the sole figure shows a vertical borehole, the process of the instant invention is also applicable to slanted borehole systems. In addition, although the sole figure shows only one well casing, the process of the instant invention is also applicable to systems wherein a plurality of well casings are employed. Furthermore, the preflush fluid can be used as a safety precaution when drilling wells through formations not definitely known to contain any lost circulation zones. Therefore, the spirit and scope of the appended claims should not necessarily be limited to the description of the preferred versions contained herein.

What is claimed is:

1. A process for forming a well, the process comprising the steps of:
   (a) drilling a borehole in the ground;
   (b) suspending a casing in the borehole;
   (c) contacting at least a portion of the region of the borehole around the outside of the casing with a preflush fluid comprising:
      (i) water;
      (ii) a cement;
      (iii) calcium sulfate; and
      (iv) a quick-hardening accelerator, the water, the cement, the calcium sulfate, and the quick-hardening accelerator each being present in the preflush fluid in a concentration sufficient to make the preflush fluid thixotropic; and
   (d) injecting a cement slurry into the region of the borehole around the casing.

2. The process of claim 1 wherein the calcium sulfate is selected from the group consisting of calcium sulfate anhydride, calcium sulfate hemihydrate, calcium sulfate dihydrate, and mixtures thereof.

3. The process of claim 1 wherein the cement is selected from the group consisting of portland cements, pozzolanic cements, fly ash cements, blast furnace cements, and mixtures thereof.

4. The process of claim 1 wherein the cement is selected from the group consisting of portland cements C, G, H, and mixtures thereof.

5. The process of claim 1 wherein the quick-hardening accelerator is an alkali metal compound.

6. The process of claim 1 wherein the quick-hardening accelerator is selected from the group consisting of potassium-containing compounds, sodium-containing compounds, and mixtures thereof.

7. The process of claim 1 wherein the quick-hardening accelerator is selected from the group consisting of potassium sulfate, sodium sulfate, potassium carbonate, sodium carbonate, potassium hydroxide, sodium hydroxide, potassium nitrate, sodium nitrate, potassium halide, sodium halide, and mixtures thereof.

8. The process of claim 1 wherein the preflush fluid comprises about 5 to about 50% BWOW portland cement, about 5 to about 30% BWOW calcium sulfate, and about 0.001 to about 20% BWOW potassium sulfate.

9. The process of claim 1 wherein the preflush fluid comprises about 10 to about 30% BWOW portland cement, about 5 to about 15% BWOW calcium sulfate, and about 1 to about 10% BWOW potassium sulfate.

10. The process of claim 1 wherein the preflush fluid weighs less than about 11 pounds per gallon.

11. The process of claim 1 wherein the preflush fluid weighs less than about 10 pounds per gallon.

12. The process of claim 1 wherein the preflush fluid weighs about 8.5 to about 11 pounds per gallon.

13. The process of claim 1 wherein the preflush fluid weighs about 9 to about 10 pounds per gallon.

14. The process of claim 1 wherein the preflush fluid further comprising a thickening agent.

15. The process of claim 14 wherein the thickening agent comprises fume silica.

16. The process of claim 14 wherein the preflush fluid comprises up to about 5 percent by weight of water fume silica.

17. The process of claim 1 wherein the preflush fluid comprises about 5 to about 50% BWOW portland cement, about 5 to about 30% BWOW calcium sulfate, about 0.001 to about 20% BWOW potassium sulfate, and about 0.001 to about 5% BWOW fume silica.

18. The process of claim 1 wherein the preflush fluid comprises about 10 to about 30% BWOW portland cement, about 5 to about 15% BWOW calcium sulfate, about 1 to about 10% BWOW potassium sulfate, and about 0.1 to about 3% BWOW fume silica.

19. The process of claim 1 wherein the preflush fluid further comprises fume silica, the cement is a portland G cement, the quick-hardening accelerator is potassium sulfate, and the weight ratio of calcium sulfate to portland G cement is about 0.5:1 to about 2:1.

20. The process of claim 1 wherein the drilling step includes the step of drilling the borehole at least partially through at least one lost circulation zone.

21. The process of claim 20 wherein the contacting step includes the step of introducing at least a portion of the preflush fluid into the lost circulation zone proximate the casing.

22. The process of claim 1 wherein the drilling step includes the step of drilling the borehole at least partially through at least one lost circulation zone located within about 1,000 feet of ground level.

23. The process of claim 1 further comprising the step of contacting at least a portion of the region of the borehole around the outside of the casing with a spacer fluid prior to step (c).

24. The process of claim 1 further comprising the step of contacting at least a portion of the inside of the casing with a displacer fluid after step (d).

25. The process of claim 1 wherein the preflush fluid weighs less than about 11 pounds per gallon; the quick-hardening agent is selected from the group consisting of potassium-containing compositions, sodium-containing compositions, and mixtures thereof; the cement is selected from the group consisting of portland cements, pozzolanic cements, fly ash cements, blast furnace cements, and mixtures thereof; the preflush fluid further comprises a thickening agent; the drilling step includes the step of drilling the borehole at least partially through at least one lost circulation zone; and the contacting step includes the step of introducing at least a portion of the preflush fluid into the lost circulation zone proximate the casing.

26. The process of claim 25 wherein the preflush fluid weighs about 8.5 to 11 pounds per gallon; the quick-hardening agent is selected from the group consisting of potassium sulfate, sodium sulfate, potassium carbonate, sodium carbonate, potassium hydroxide, sodium hydroxide, potassium nitrate, sodium nitrate, potassium halide, sodium halide, and mixtures thereof; the cement is selected from the group consisting of portland cements C, G, H, and mixtures thereof; the thickening agent is fume silica; and the process further comprises the step of contacting at least a portion of the region of the borehole around the outside of the casing with a spacer fluid prior to step (c), and the step of contacting at least a portion of the inside of the casing with a spacer fluid after step (d).

27. The process of claim 26 wherein the preflush fluid weighs about 9 to about 10 pounds per gallon and comprises about 5 to about 50% BWOW portland cement, about 5 to about 30% BWOW calcium sulfate, about 0.001 to about 20% BWOW potassium sulfate, and about 0.001 to about 5% BWOW fume silica; and the drilling step includes the step of drilling the borehole at least partially through at least one lost circulation zone located within about 1,000 feet of ground level.

28. A process for forming a well, the process comprising the steps of:
   (a) drilling a borehole in the ground;
   (b) suspending a casing in the borehole;
   (c) contacting at least a portion of the region of the borehole around the outside of the casing with a preflush fluid comprising:
      (i) water;
      (ii) about 5 to about 50% BWOW cement; and
      (iii) a concentration of calcium sulfate and a concentration of a quick-hardening agent sufficient to quicken the gelling of the preflush fluid upon standing; and
   (d) injecting a cement slurry into the region of the borehole around the casing.

29. A process for forming a well, the process comprising the steps of:
   (a) drilling a borehole in the ground;
   (b) suspending a casing in the borehole;
   (c) contacting at least a portion of the region of the borehole around the outside of the casing with a preflush fluid weighing less than 11 pounds per gallon and comprising:
      (i) water;
      (ii) cement;
      (iii) calcium sulfate; and
      (iv) a quick-hardening agent; and
   (d) injecting a cement slurry into the region of the borehole around the casing.

30. A well system comprising:
   (a) a vertical section of earth containing at least one lost circulation zone formation;
   (b) a borehole penetrating at least a portion of one lost circulation zone formation;
   (c) a casing positioned in at least a portion of the borehole; and
   (d) a gel-like material occupying at least a portion of at least one lost circulation zone penetrated by the borehole, the gel-like material being proximate the casing and being formed substantially from a fluid comprising:
      (i) water;
      (ii) a first cement;
      (iii) calcium sulfate; and
      (iv) a quick-hardening agent, wherein the weight ratio of the calcium sulfate to the first cement is about 0.5:1 to about 2:1.

31. The well system of claim 30 further comprising a second cement, the second cement occupying at least a portion of the space between the outside of the casing and the inside of the borehole.

32. The well system of claim 30 further comprising a natural resource formation, the natural resource formation being at least partially penetrated by the borehole.

33. The well system of claim 32 wherein the natural resource formation is a natural gas formation.

34. The well system of claim 32 wherein the natural resource formation is an oil formation.

35. The well system of claim 32 wherein the natural resource formation is a geothermal formation.

36. The well system of claim 30 wherein at least a portion of the gel-like material is located in an lost circulation zone and within about 1,000 feet of the ground surface.

37. The well system of claim 32 further comprising a second cement and a natural resource formation, the second cement occupying at least a portion of the space between the outside of the casing and the inside of the borehole, and the natural resource formation being at least partially penetrated by the borehole; and wherein at least a portion of the gel-like material is within an, lost circulation zone and within about 1,000 feet of the ground surface.

38. A well system comprising:
(a) a vertical section of earth containing at least one lost circulation zone formation;
(b) a borehole penetrating at least a portion of one lost circulation zone formation;
(c) a casing positioned in at least a portion of the borehole; and
(d) a gel material occupying at least a portion of at least one lost circulation zone penetrated by the borehole, the gel being proximate the casing and being formed substantially from a fluid comprising:
(i) water;
(ii) about 5 to about 50 % BWOW first cement; and
(iii) a concentration of calcium sulfate and a concentration of a quick-hardening agent sufficient to quicken the gelling of the fluid.

39. The well system of claim 38 wherein the weight ratio of the calcium sulfate to the first cement in the fluid is about 0.5:1 to about 2:1.

40. A well system comprising:
(a) a vertical section of earth containing at least one lost circulation zone formation;
(b) a borehole penetrating at least a portion of one lost circulation zone formation;
(c) a casing positioned in at least a portion of the borehole; and
(d) a gel-like material occupying at least a portion of at least one lost circulation zone penetrated by the borehole, the gel-like material being proximate the casing and being formed substantially from a fluid weighing about 8.5 to about 11 pounds per gallon and comprising:
(i) water;
(ii) a first cement;
(iii) calcium sulfate; and
(iv) a quick-hardening agent.

41. The well system of claim 40 wherein the fluid comprises about 5 to about 50% BWOW of the first cement.

42. The well system of claim 40 wherein the weight ratio of the calcium sulfate to the first cement in the fluid is about 0.5:1 to about 2:1.

43. The well system of claim 40 wherein the fluid comprises about 5 to about 50% BWOW of the first cement and the rate ratio of the calcium sulfate to the first cement in the fluid is about 0.5:1 to about 2:1.

* * * * *